Figure 1:
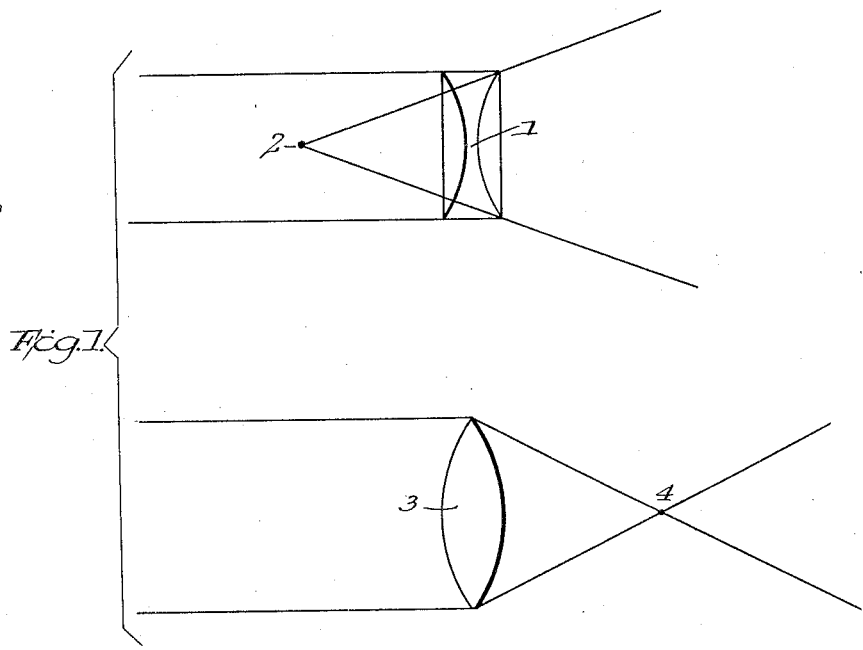

Oct. 21, 1941.  R. MÖLLER ET AL  2,260,228
MEANS FOR PROJECTING IMAGES
Filed April 21, 1938  3 Sheets-Sheet 1

Inventors
Rolf Möller
Erich Schwartz
Georg Jaeckel

By Lippincott & Metcalf Attorneys

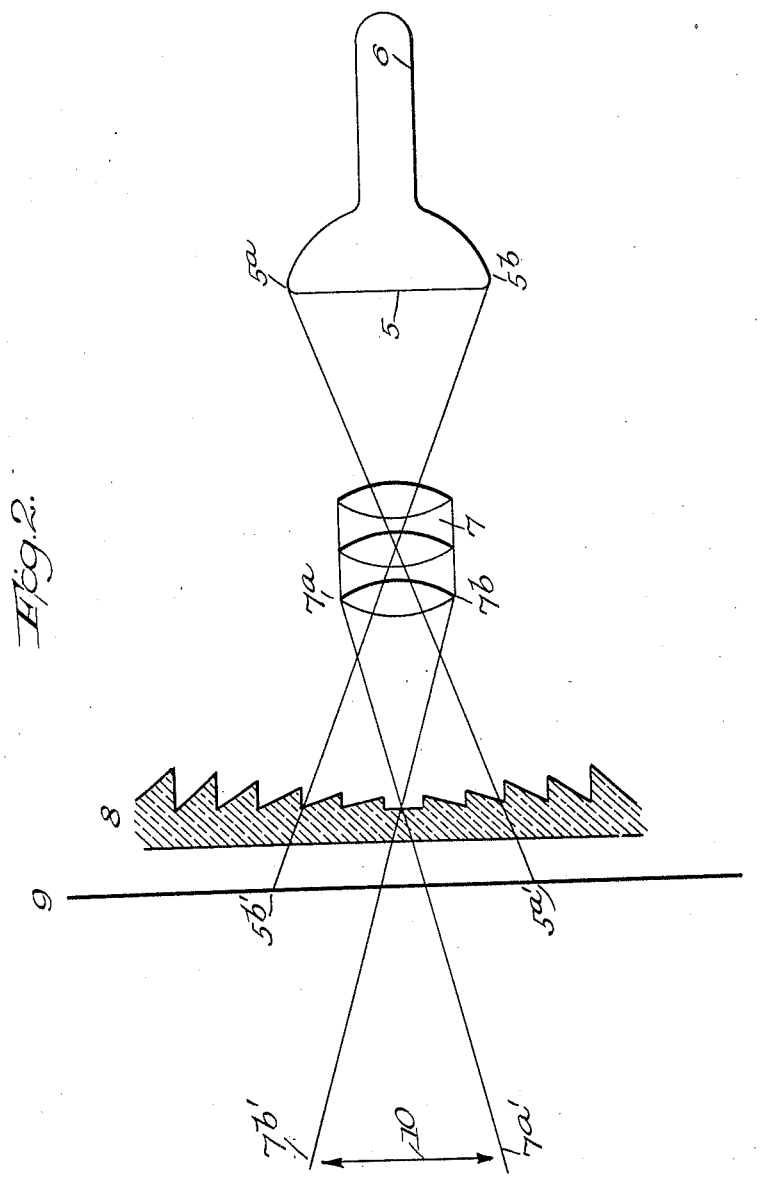

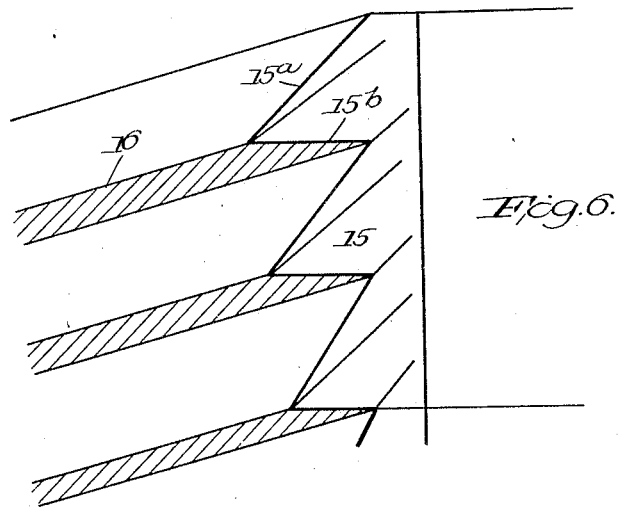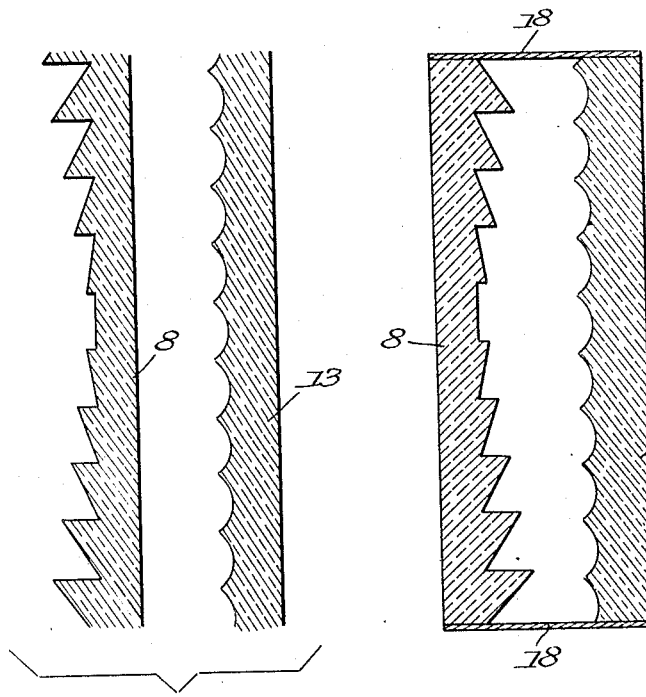

Patented Oct. 21, 1941

2,260,228

UNITED STATES PATENT OFFICE 2,260,228

MEANS FOR PROJECTING IMAGES

Rolf Möller, Berlin-Zehlendorf, Erich Schwartz, Berlin-Lichterfelde, and Georg Jaeckel, Berlin-Neukolln, Germany, assignors to the firm Fernseh Aktiengesellschaft, Zehlendorf, near Berlin, Germany Application April 21, 1938, Serial No. 203,426
In Germany April 21, 1937

1 Claim. (Cl. 88—24)

The invention relates to projection of images, particularly television images, by means of transparent projection screens; and this application is a continuation in part of the co-pending application, Serial Number 180,233, filed December 16, 1937, by Erich Schwartz and which has become U. S. Patent No. 2,213,077, dated Aug. 27, 1940. The co-pending application relates to transparent projection screens for so-called daylight projection, in which the image is projected from that side of the screen remote from the viewers. The screens provided for by the co-pending application consist of a plurality of minute dispersing lenses in combination with a condensing lens in close proximity thereto. The purpose thereof is to convey to all individual light rays, incident upon the projection screen, a direction parallel to the optical axis of the individual lenses, which optical axes are in turn parallel to each other. Thereby, the axes of all elementary cones of light emanating from the individual lenses are parallel to each other.

It is the object of this invention to improve the system described in the co-pending application; to provide for more efficient utilization of the light source. Other objects and features of advantage will be set forth in the following description of specific apparatus embodying and utilizing our novel method. The screen, described in the co-pending application, from which all individual cones of light emanating from the screen have axes parallel to each other, whereby an image of the projection objective is produced in an infinite distance from the screen, has the disadvantage that the projected image, observed by viewers distributed over a large area, does not possess sufficient brilliancy and sharpness. In order to eliminate this defect, our invention provides that a real magnified image of the projection objective is projected into the viewing plane by means of a condensing lens. By this measure, a greater amount of the light emanating from the original source is concentrated in the area enclosing the observers. This naturally results in a more efficient utilization of the original light source.

Broadly considered, our method comprises the steps of producing a luminous image, such as the fluorescent image on the screen of a cathode ray tube: to transmit a portion of the light radiated by said image through a projection objective, and projecting an image of said luminescent image through a condensing lens upon a light dispersing screen; and to produce an image of said projection objective in the viewing plane in which the observers are located.

Our invention may be explained with the aid of the drawings accompanying this specification, some of which drawings show embodiments of the invention.

Figures 3, 5:
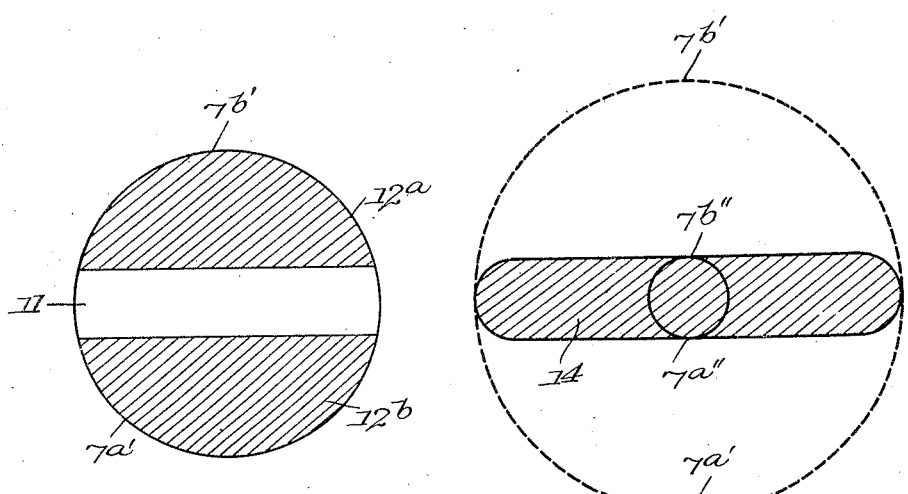

Referring to the drawings, Fig. 1 schematically shows the action of one of the minute dispersing or concentrating lenses, respectively. Fig. 2 is a schematic drawing of our projection method. Fig. 3 shows the light distribution in space in the plane of the observers for a greatly magnified reproduction of the objective. Fig. 4 shows an arrangement for distortion of the image of the projection objective in the viewing plane. Fig. 5 schematically shows the light distribution in space in the viewing plane for a distorted image of the projection objective. Fig. 6 shows a cross-section of a preferable arrangement of the condensing lens and a preferred type of screen. Fig. 7 shows a cross-section of another arrangement of condensing lens and preferred type of screen.

Referring to Fig. 1, parallel light rays incident upon a dispersing lens 1 possess a virtual focal point 2 and fill a solid angle after emanating from said lens. Parallel light rays incident upon a condensing lens 3 are concentrated after transmission into a real focal-point 4, and then fill a similar cone of radiation, as in the first-mentioned case. When a viewing screen is constructed in accordance with the disclosure of the co-pending application of Erich Schwartz previously referred to, one or both surfaces of the screen is composed of a large number of minute lenses 1 or 3 formed side by side over the area of the screen. The ratio of the distance of the focal points 2 and 4 to the distance of one observing an image on the screen is so small that the optical impression presented to an observer, while viewing an image projected onto the screen, is the same whether the lens be a dispersing lens of the type 1 or a condensing lens of the type 3.

In the arrangement shown in Fig. 2, an image developed between the points 5a and 5b of the fluorescent screen 5 of the cathode ray tube 6 is projected by means of the projection objective upon the viewing screen 9, and forms an enlarged image thereon between the points 5a' and 5b'.

The Fresnel lens 8 is provided for the purpose of developing an enlarged image of the objective 7 between points 7a and 7b in the viewing plane 10 between points 7a' and 7b'.

In most cases, the distance of the projection objective 7 from the screen 9 is predetermined by the mechanical dimensions of the television receiving apparatus, while the distance between the screen 9 and the viewing plane 10 is determined by the magnification of the television image and the number of scanning lines in the television image. If these values are given, the required focal length $f$ of the Fresnel lens 8 is readily computed from the formula $$\frac{1}{f} = \frac{1}{D} + \frac{1}{d}$$

whereby $D$ is the distance between the screen 9 and the projection objective 7, and $d$ the distance between the projection screen 9 and the viewing plane 10.

Light from all points of a fluorescent image on screen 5 is transmitted through the objective 7, and each point of the objective is illuminated by light from all points of the image. Hence, if a real image of the objective is formed in the plane 10, the entire light flux transmitted through the objective is concentrated within the area of this image. Consequently, an observer having his eye positioned within the area of the image of the objective in the plane 10, sees an extremely bright enlarged view of the fluorescent image on the screen 5. If the observer moves his eyes outside the area just referred to, he no longer sees an image since the entire light flux passes his eyes without becoming incident thereon. In this manner, all light flux available is concentrated within a predetermined useful area.

Fig. 3 shows the conditions prevailing when the diameter of the projected image of the projection objective in the viewing plane is made equal to the width of a row of observers. The eyes of observers when seated will be in substantially the same height within reasonable limits and may lie within zone 11 of Fig. 3. It may be seen that zones 12a and 12b are not made use of in spite of their being equally as well adapted for viewing as zone 11. Therefore, the light efficiency of such a system is poor, because the light in zones 12a and 12b is wasted as far as viewing is concerned.

It would now seem obvious to reduce the size of the image of the projection objective, in order to increase the efficiency. If the image size is reduced to approximately the size of a human head, the efficiency will become great, but the number of viewers will be limited to one. As it is in most cases desired to make the image accessible to a larger number of persons seated in a row, our invention provides for distortion of the image of the projection objective in horizontal direction. The horizontal distortion is made sufficiently large that the eyes of all viewers will still be within the area covered by the image of the projection objective. The distortion of this image may be accomplished by means of a positive Fresnel lens in combination with a screen, consisting in effect of a plurality of vertically-positioned negative cylindrical lenses arranged in a plane normal to the optical axis of the Fresnel lens, as shown by 8 and 13 of Fig. 4.

Fig. 5 shows the conditions of light distribution in space in the viewing plane for the distorted image of the projection objective. The dotted circle between points 7a' and 7b' shows the area covered by the image of the projection objective for the condition that this area should cover a row of seated viewers without the image of the projection objective being distorted. The circle between points 7a'' and 7b'' shows the image of the projection objective reduced to the size where the image is accessible to one viewer only. Shaded zone 14 shows the area covered by the distorted image of the projection objective, whereby it may be seen that this area now covers a band, the height of which may be equal to or slightly greater than the length of a human head, and which band length may be equal to that of a row of viewers. From the drawing, it may be apparent that the light available is now concentrated into the zone of utilization, whereby the viewers will see a brighter image. However, if a viewer moves his eyes outside of the shaded area 14, he will no longer see an image.

When using our method for projection of television images, we prefer to make the sides of the circular grooves of the positive Fresnel lens smaller than the width of a scanning line to be projected, and we prefer to make it approximately one-half the width of a projected scanning line. By doing so, this guarantees that the circular grooves are not noticeable to the viewer. In cases where difficulty is encountered in fulfilling these requirements, it may suffice to maintain the dark zones in the light path appearing between two grooves narrower than one-line width. As may be seen from Fig. 6, light rays incident upon surfaces 15a of grooves 15 are deflected in such a manner that they emanate from the Fresnel lens in a direction parallel to the optical axis. Light rays, however, incident upon surfaces 15b of grooves 15, which surfaces are nearly parallel to the optical axis, are so deflected that they are lost for future utilization, thus forming dark zones 16, indicated by the shaded areas in Fig. 6.

In the aforementioned co-pending application, it is mentioned that the projection screen can be made of artificial glass. We have found that the Fresnel lens also can be made of organic substances which are optically and thermoplastically suitable, such as artificial resin, or other substances. It is then possible to produce particularly cheap projection screens and Fresnel lenses at manufacturing temperatures as low as between 70 and 200 centigrade. It is thus possible to make either the lens screen, or the Fresnel lens, or both, of artificial substances.

Finally, this invention provides that the curved portions of screen 17 and Fresnel lens 8, in Fig. 7, are placed opposite each other and surrounded by a dust-tight housing 18, in order to prevent accumulation of dust on the curved portions of both parts.

Projection screens as provided by this invention are applicable for all projection purposes. Their main application, however, will be in the field of television.

We claim:

A projection system comprising a transparent viewing screen, means for projecting onto said screen an image of a subject, and means for concentrating substantially within a rectangular area of a viewing plane the light energy of said image comprising a viewing screen, and a Fresnel lens for concentrating the light energy of the projected image within a circular area of said viewing plane, said viewing screen comprising a plurality of vertically positioned cylindrical lenses for spreading along the horizontal axis of said viewing plane the concentration of light energy effected by said Fresnel lens.

ROLF MÖLLER.
GEORG JAECKEL.
ERICH SCHWARTZ.